Nov. 23, 1965  N. S. WOOLDRIDGE  3,219,364
PIPELINE COUPLING
Filed May 24, 1963  3 Sheets-Sheet 1
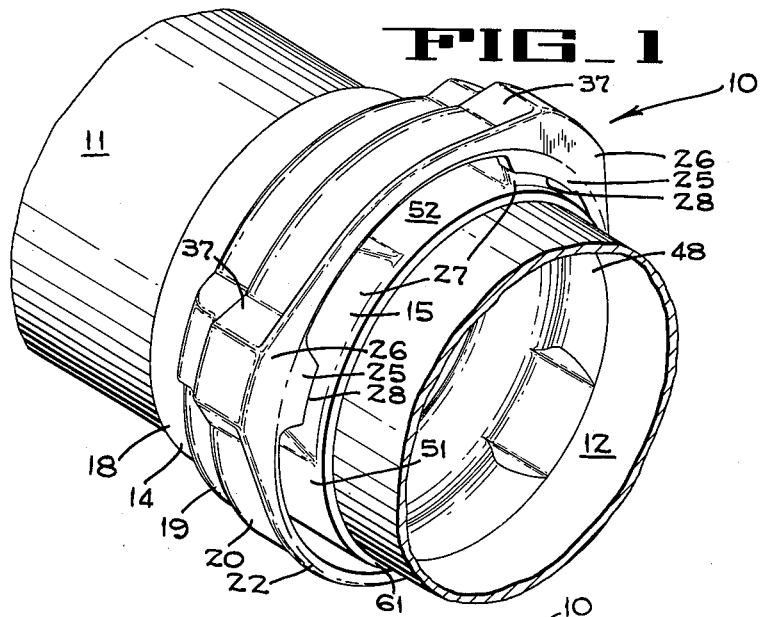
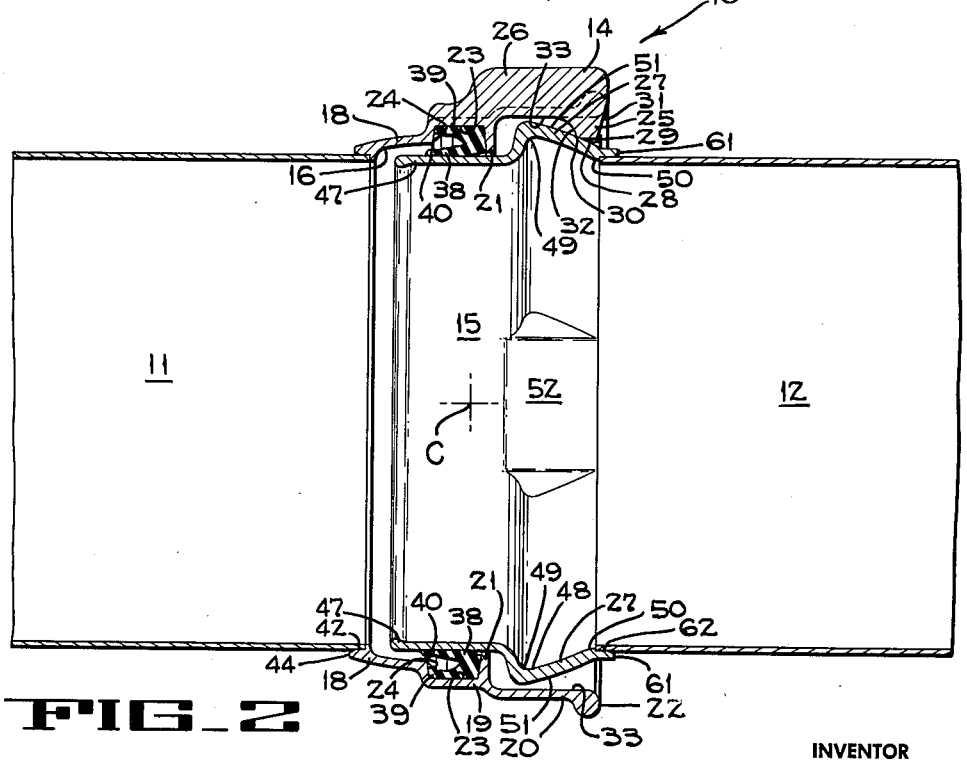
INVENTOR
NORMAN S. WOOLDRIDGE
BY Hans G. Hoffmeister
ATTORNEY Nov. 23, 1965  N. S. WOOLDRIDGE  3,219,364
PIPELINE COUPLING
Filed May 24, 1963  3 Sheets-Sheet 2
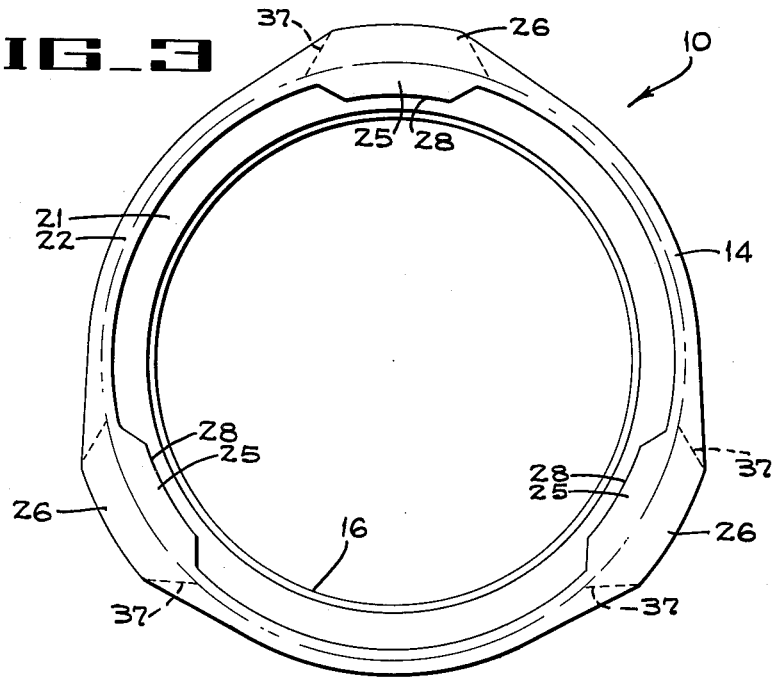
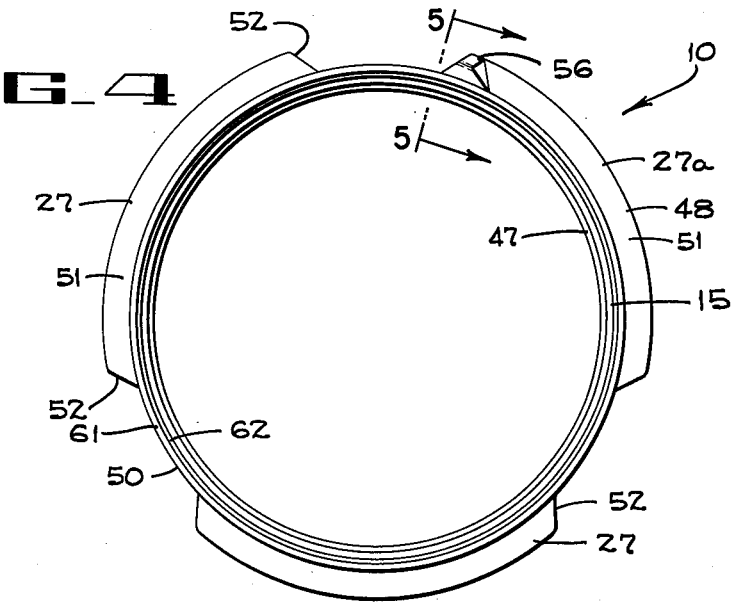
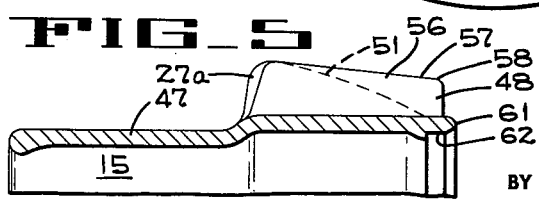
INVENTOR
NORMAN S. WOOLDRIDGE
BY Hans G. Hoffmeister
ATTORNEY

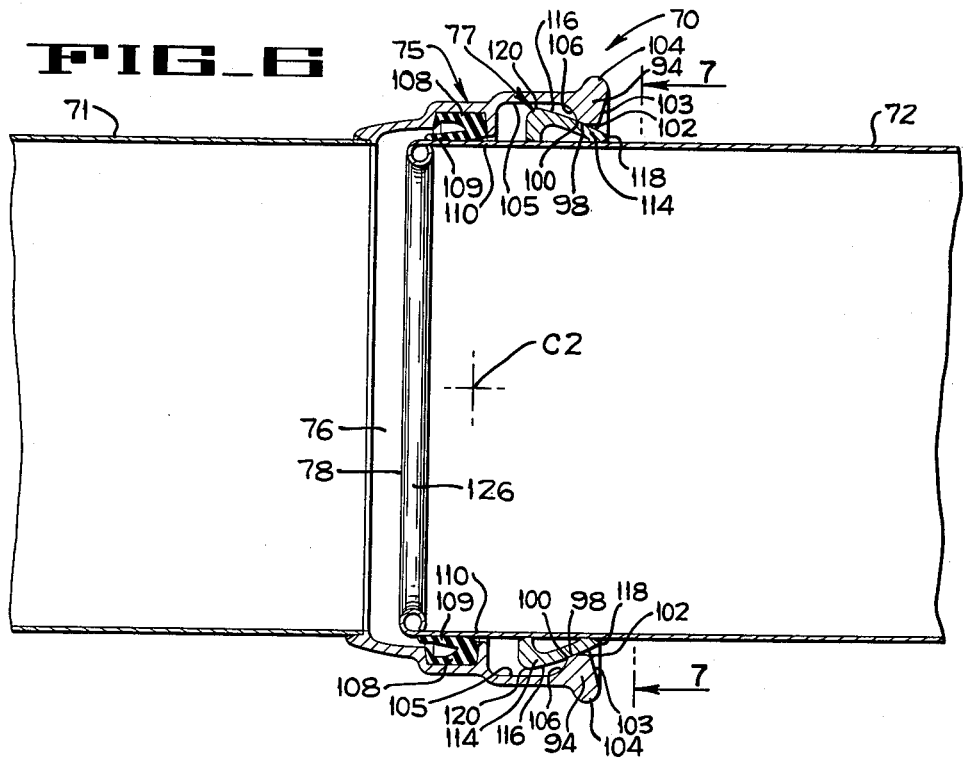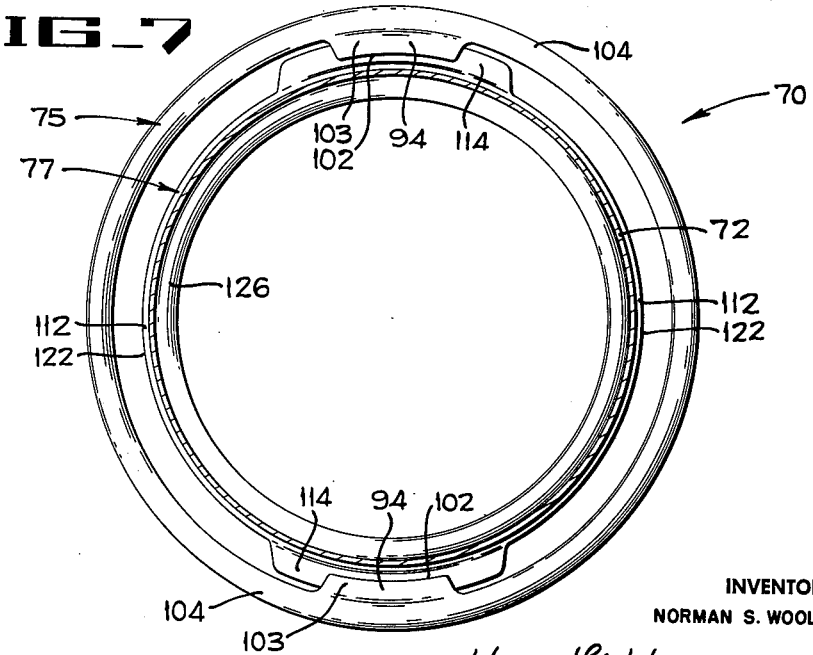

United States Patent Office 3,219,364
Patented Nov. 23, 1965

3,219,364
PIPELINE COUPLING
Norman S. Wooldridge, Saratoga, Calif., assignor to FMC Corporation, San Jose, Calif., a corporation of Delaware
Filed May 24, 1963, Ser. No. 283,010
2 Claims. (Cl. 285—5)

This invention pertains to couplings and more particularly to couplings for the relatively light weight pipe lines commonly used in irrigation.

An object of the invention is to provide an improved pipeline coupling.

Another object of this invention is to provide a two-piece coupler of simple construction which is particularly adapted for use with large diameter irrigation pipe sections.

Another object of the invention is to provide a coupling by which two pipeline sections can be quickly interconnected and disconnected, even in the event of moderate misalignment of the pipeline sections.

Another object is to provide a two-piece coupling for pipeline sections which is characterized by a uniformly fluid-tight seal between the two coupling members throughout their entire circumference, even if the pipeline sections are somewhat out of coaxial alignment.

Another object of this invention is to provide a coupling for pipeline sections having means for preventing any material extent of relative movement between the sections in an axial direction.

Another object of the invention is to provide the coupling with means which facilitate placing the two coupler members in the relationship which provides the greatest assurance against their accidentally becoming disconnected.

Another object is the provision of a pipeline coupling including two coupler members adapted to be interconnected by a bayonet-type joint and including means for indicating to a person disconnecting the coupler members when they have been turned with respect to each other to the relative positions thereof wherein they can be pulled apart in relative axial movement.

Other objects, features and advantages of the invention will be apparent from the following detailed description, reference being made to the annexed drawings in which:

FIGURE 1 is a perspective of the pipeline coupling of the present invention, showing parts of two pipeline sections interconnected thereby.

FIGURE 2 is an axial section of the coupling of FIGURE 1.

FIGURE 3 is a front elevation of the outer member of the pipeline coupling.

FIGURE 4 is a front elevation of the inner member of the pipeline coupling.

FIGURE 5 is an enlarged, fragmentary section along line 5—5 of FIGURE 4.

FIGURE 6 is an axial section of a second embodiment of the present invention showing parts of two pipeline sections interconnected thereby.

FIGURE 7 is a section along line 7—7 of FIGURE 6.

The pipeline coupling 10 of the invention, which advantageously is made of cast aluminum, functions to releasably interconnect two aligned irrigation pipeline sections 11 and 12 in flow-conducting and leak-proof relation. As shown in FIG. 2, one end of the pipe section 11 is fixedly connected to the outer tubular coupler member 14 of the coupling 10, and one end of the pipe section 12 is fixedly connected to the inner tubular coupler member 15 of the coupling 10.

The outer coupler member 14 has a longitudinal bore 16 therethrough and comprises three sections of annular form, namely: a slightly tapering neck section 18, an intermediate cylindrical section 19, and a terminal section 20 which also is cylindrical. An annular rib 21 projects radially inward from the terminal section 20, a substantial distance from the front end surface 22 of the coupler member 14, and an annular seal ring groove 23 is defined between the rib 21 and a radially extending shoulder 24 adjacent the juncture between the neck and intermediate sections 18 and 19, respectively. The rib 21 has the smallest inside diameter of any part of the outer coupler member 14 which receives any part of the inner coupler member 15 and the diameter of the inner surface of the terminal section 20 is the largest inside diameter of the member 14.

The outer coupler member 14 is of substantially uniform thickness throughout its length, except at three places spaced equally about the circumference of the member 14. At these places, the wall of the member is thicker, as shown at the upper part of FIG. 2, to present inwardly projecting interlock flanges 25 and outwardly projecting lugs 26. The interlock flanges 25 cooperate with a like number of protrusions 27 (to be described presently) on the outer surface of the inner coupler member 15, to releasably interconnect the outer and inner coupler members 14 and 15, respectively.

The three inwardly projecting flanges 25 are all of the same size and shape, and are in transverse planar alignment. The radially inner surfaces 28 of the three flanges 25 are arcuate about, and are equal radial distances from, the axis of the bore of the coupling member 14. The arcuate inner face 28 (FIG. 2) of each flange 25 terminates along its longer sides in outer and inner corners or edges 29 and 30, respectively, which constitute the respective intersections of the radially inner face 28 with the axially outer face 31 and the axially inner face 32 of the associated flange 25. The axially outer faces 31 of the interlock flanges 25 constitute radially inward extensions of the end surface 22 of the outer coupler member 14, and the axially inner faces 32 of the flanges 25 are of curved cross section to merge gradually into the radially inner surface 33 of the terminal section 20 of the coupling member 14.

The mentioned lugs 26 are integral with the terminal section 20 and project from the outer circumferential face thereof, each lug 26 being opposite one of the inwardly projecting flanges 25. These lugs present shoulders 37 at their ends, which are useful in turning the coupler member 14 when tightening or loosening their interengagement, whether the tightening and loosening operations are performed by means of a special spanner wrench, by hand without the use of any tool, or by hammering.

A resiliently flexible seal ring 38 of the chevron type is seated within the ring groove 23, with one lip 39 engaging the inner surface of the intermediate section 19 of the coupler member 14 and with the other lip 40 in position to engage the outer surface of the inner coupler member 15 when the coupling 10 is made up; i.e., when the two coupler members 14 and 15 are interengaged in coupling relation. The parts are so proportioned that when this occurs, the annular space between the lips 39 and 40 of the seal ring opens into the bore of the neck portion 18 of the coupler member 14. Thus, the inner surfaces of the lips 39 and 40 are exposed to the full hydrostatic pressure of the liquid within the bore of the coupling 10, so that the seal ring 38 is energized thereby into sealing pressure engagement with the inner surface of the outer coupling member 14 and the outer surface of the inner coupling member 15, to prevent leakage therebetween.

A counterbore 42 (FIG. 2) is formed in the axially inner end 44 of the outer coupler member 14 (i.e., the end opposite that through which the inner coupler member 15 enters when the coupling 10 is being made up). This counterbore 42 is dimensioned to receive the end of the pipe section 11, which is secured therein, as by welding, to permanently mount the outer coupler member 14 upon the pipe section 11 in flow conducting communication therewith.

The inner coupler member 15 comprises a cylindrical seal section 47 and an interlock section 48, best illustrated in FIGURE 5. The seal section 47 is of sufficiently smaller diameter than the inner edge of the rib 21 to enable the seal section to slip easily past the rib and through the seal ring 38, as shown in FIG. 2. The parts are so proportioned that when the coupling 10 is made up, the seal section 47 extends almost through the neck section 18 of the outer coupler member 14 and to a position spaced only a short distance from the end of the pipe section 11 within the outer coupler member 14. Further, the diameter of the bore of the seal section 47 substantially corresponds to the inside diameter of the pipeline sections 11 and 12, thus providing a substantially smooth bore through the coupling 10 to minimize turbulence of fluid flowing therethrough.

The interlock section 48 through most of its circumference is of larger diameter at the end 49 (FIG. 2) thereof which is nearer the seal section. The other, or smaller end 50 of the interlock section substantially corresponds in diameter to the inner end of the pipeline section 12; i.e., the axial end of the member 15 to which the pipe section 12 is fastened. The outer surface 51 has the form of a spherical zone, being convex in longitudinal section about a center C (FIG. 2) lying in the axis of the coupler member 15 approximately two fifths of the length of the coupler member 15 inward from the distal end thereof.

The outside diameter of the larger end 49 of the interlock section 48 is considerably greater than the diameter of the circle within which the arcuate inner surfaces 28 of the flanges 25 lie but is less than the diameter of the radially inner face 33 of the terminal section 20 of the outer coupler member 14. Furthermore, three depressions 52 are formed in the interlock section 48, at equal circumferential spacing, these depressions being slightly deeper than the height, measured radially, of the flanges 25, and each being slightly wider, measured circumferentially, than the corresponding dimension of one of the flanges 25. Consequently, the inner coupler member 15 can be inserted into the outer coupler member 14 provided they are so related to each other that the flanges 25 register with the depressions 52, whereupon they can be moved axially relatively to each other until the larger end 49 of the interlock section 48 has passed inward beyond the transverse plane which includes the inner edges 30 of the inner surfaces 28 of the flanges 25. The coupler members 14 and 15 can then be turned relatively to each other so that the flanges 25 no longer register with the depressions 52. The parts of the interlock section 48 between the depressions 52 constitute the hereinbefore mentioned protrusions 27 on the inner coupler member 15 which interlock with the flanges 25 of the outer coupler member 14 to restrain the members 14 and 15 from separating from each other in relative axial movement after the flanges 25 and depressions 52 have thus been removed from registration with each other, as clearly indicated in the upper part of FIG. 2.

Means are provided for limiting the extent which one of the coupler members can be turned relatively to the other after the inner member 15 has been inserted into the outer member 14 far enough to pass the protrusions axially inward beyond the transverse plane of the edges 30 of the flanges 25. At least one of the protrusions 27, say the one which is indicated at 27a in FIG. 4, has an outwardly projecting limit stop 56 formed at an end thereof. The term "end" in this instance is employed to indicate the margin of the protrusion 27a which trails when the inner coupler member 15 is turned within the outer coupler member to displace the depressions 52 from registry with the flanges 25. The limit stop 56 constitutes a circumferential continuation of the projection 27a which in the region thereof adjacent the seal section 47 corresponds in height to the highest part of the projection 27a. From this region, however, the radially outer face 57 of the limit stop slopes less steeply toward the inner end of the coupler member 15 as compared with the outer surface 51 of interlock section 48. Consequently, in the region adjacent the inner end of the coupler member 15, the limit stop 56 projects radially outward farther than the corresponding part of the projection 27a, so that a circle centered on the axis of the coupler member 15 and drawn through the lower part 58 (FIG. 5) of the outer face 57 would be of greater diameter than the circle which includes the inner faces 28 of the flanges 25. Consequently, after the inner coupler member 15 has been inserted into the outer member 14 with the flanges 25 in registry with the depressions 52 as above described, and the inner member 15 is then turned relatively to the outer member (or vice-versa) to displace the depressions 52 from registry with the flanges 25, the extent to which such relative rotation can be continued is limited by engagement of the limit stop 56 with the flange 25 behind which the protrusion 27a has been moving while the relative rotary motion of the coupler members was occurring. Thus the extent of the relative rotary motion is limited to less than 120°, and thereby prevents the parts from being turned far enough for the depressions 52 and the flanges 25 to be brought into alignment again, which would enable the two coupler members 14 and 15 to separate from each other accidentally.

A short cylindrical flange 61 projects from the smaller end of the interlock section 48. This flange 61 constitutes the axially inner end of the inner coupler member 15, and is formed with a counterbore 62 within which one end of the pipe section 12 fits and is secured as by welding, so that the inner coupler member 15 is, in effect, an extension of the pipe section 12 in flow conducting communication therewith.

The manner in which the coupler members 14 and 15 are engaged with each other to interconnect the two pipe sections 11 and 12 in flow conducting communication should be apparent from the above description of the construction of the coupling 10. The two coupler sections 14 and 15 are first brought into, or nearly into coaxial relation. Either or both of the pipes 11 and 12, with the respective coupler members 14 and 15 thereon, are rotated about their respective axes until the flanges 25 and depressions 52 are in alignment with each other, whereupon one or both members 14 and 15 can be moved axially, with each flange 25 passing through one of the depressions 52, thus to effect telescoping of the inner member 15 into the outer member 14. This disposes the cylindrical section 47 of the inner member 14 within the seal ring 38 in fluid sealing relation therewith, and likewise disposes the protrusions 27 of the inner member 15 more deeply within the outer member 14 than the plane which includes the inner edges 30 of the flanges 25. Then either coupler member 14 or 15 can be turned relatively to the other, disposing each flange 25 behind one of the protrusions 27, and thereby interconnecting the coupling members in a manner resembling that in which a "bayonet joint" is made up. Such relative rotation between the coupler members 14 and 15 should be continued until it is positively terminated by engagement of the limit stop 56 with an end of a flange 25, which indicates to the operator that the operation of making up the coupling 10 has been completed, i.e., that the two coupler members 14 and 15 have attained the optimum relative positions wherein the greatest security of the made-up coupling is assured.

Uncoupling of the coupler members 14 and 15 to disconnect the pipes 11 and 12 is accomplished by reversal of the above described coupling operation. The coupler members are first relatively turned in the opposite direction until rotation is interrupted by engagement of the limit stop 56 with the flange 25 next adjacent to the flange 25 behind which the protrusion 27a has been engaged. This serves as an indication to the operator that the flanges 25 and depressions 52 have again been brought into registry whereupon the coupler sections 14 and 15 can be moved apart axially, thus disconnecting the pipe sections 11 and 12.

As clearly shown in FIG. 2, the outside diameter of each part of the inner coupler member 15 is significantly smaller than the inside diameter of the part of the outer coupler member 14 which is in radial alignment therewith when the coupling 10 is fully made up. This feature, in conjunction with the longitudinally curved nature of the outer surface 51 of the interlock section 48 and the yieldable and deformable characteristic of the seal ring 38, permits the coupling 10 to be made up in the manner above described, and thus to interconnect the two pipe sections 11 and 12 in flow conducting communication and without leakage at the coupling, even when the two pipes are several degrees out of coaxial alignment. In this regard, the importance of the longitudinally convex nature of the outer surface 51 of the interlock section 48 can most readily be appreciated by considering first the relationship of the flanges 25 and the protrusions 27 when the two pipeline sections are coaxially aligned. Under these circumstances, all three protrusions are seated to the same depth within the outer coupler member 14, i.e., all three protrusions are the same distance inward from the end surface 22 of the outer coupler member, and all three flanges 25 engage corresponding parts of the respectively associated protrusions 27, and any stresses tending to force the inner coupling member axially outward of the outer coupling member are borne equally by all three flanges 25. Now consider what happens when the pipeline section 12 is pivoted downward from the position in which it is illustrated in FIG. 2. The protrusion 27 at the upper part of this figure slides outward slightly with respect to the flange 25 which it engages, moving in an arcuate path about a center C (FIG. 2) which substantially coincides with the center of the spherical outer surface 51 of the protrusion. Consequently, this upper flange 25 continues to bear against the associated protrusion 27 with substantially the same pressure as while the pipeline sections were in coaxial alignment. The other two protrusions 27, being below the axis of the coupling, move more deeply into the outer coupling member 14, and, because of their spherical form maintain substantially the same pressure against their respectively associated flanges 25. Consequently, even when the pipeline sections 11 and 12 interconnected by the coupling 10 are out of coaxial alignment to a moderate extent, say 4 or 5 degrees, any load on the members 14 and 15 tending to force them apart is substantially uniformly distributed among the three flanges 25 and protrusions 27.

Moreover, the above described location of the center C of longitudinal curvature of the outer surface 51 of the interlock section 48 is significant in connection with relative movement of the pipeline sections into and out of coaxial alignment, since the center C is thus disposed in radial alignment with the seal ring 38 when the coupling is made up. Because of this position of the center C, the relative movement between the seal section 47 of the inner coupling member and the seal ring 38 which occurs during such relative movement of the pipeline section is almost entirely in an axial direction, with only a negligible component of the relative movement between the seal ring 38 and the seal section 38 taking place in a radial direction. Consequently, deformation of the seal ring as a consequence of movement of the pipeline sections out of coaxial alignment, and of the coupling being made up while the pipeline sections are out of coaxial alignment, is minimized.

Another embodiment of the present invention illustrated in FIGS. 6 and 7, comprises a pipeline coupling 70, also advantageously made of aluminum, and functions to interconnect pipeline sections 71 and 72 in flow-conducting anl leak-proof relation. As shown in FIG. 6 the coupler 70 includes an outer coupler member 75 which is fixedly connected to one end of the pipeline section 71, and an inner coupler member 77 shaped like an annular collar which is fixedly connected to the pipeline section 72 in a position spaced from the end 78 of the section 72 which is to be received within the outer coupler member 75.

The outer coupler member 75 is similar in construction to the outer coupler member 14 of the first described embodiment, its only significant feature wherein it differs therefrom being that the coupler member 75 includes only two flanges 94 projecting radially inward adjacent the outer end of the coupler member instead of the three inwardly projecting flanges 25 of the first described embodiment. The two flanges 94, both of the same size and shape, are diametrically opposite each other. The dimension of each flange measured circumferentially of the coupler member 75 is approximately thirty degrees, although this dimension is not critical. Each of the flanges 94 includes an inner surface 98 which is arcuate about a center located substantially on the longitudinal axis of the coupler member 75. Both arcuate surfaces 98 terminate at their axially inner ends in inner edges 100 lying in a common transverse plane. The outer axial end of the inner arcuate surface 98 of each flange 94 terminates at an outer edge 102 where the surface 98 intersects the outer face 103 of the flange, which has the form of a conical frustum since it tapers axially inward; i.e., the inner edge of the flange is deeper within the coupler member 75 than the base of the flange where the outer face joins a bead 104 formed on the distal end of the coupler member 75. The inner edge 100 of each flange 94 is connected to the inner cylindrical surface 105 of the coupler member 75 by a shoulder 106 of arcuate across section which gradually merges with the surface 105. As in the first described embodiment, an important constructional detail of the coupling 70 is that the axially inner edges 100 of the two flanges 94 are both arcuate about a common point on the longitudinal axis of the bore 76 of the outer coupler member 75.

No outwardly projecting lugs are provided on the outer surface of the coupler member 75 as in the embodiment of FIGS. 1–5. It has been found that due to the relatively large size of irrigation pipe couplings adequate torque can usually be applied to them by hand to engage and disengage them thus making it practical, in most instances, to dispense with protrusions, flats, or other tool-engaging features on the outer surfaces of the couplings.

A resiliently flexible seal ring 108 similar in all respects to the seal ring 38 of the first described embodiment is similarly seated within the coupler member 75 and operates in a similar manner, with the exception that the inner lip 109 of the seal ring 108, instead of engaging a part of the inner coupler member 77 when the coupling 70 is made up, engages the outer surface of the portion 110 of the pipeline section 72 between the end 78 thereof and the inner coupler member 77.

Throughout most of its circumferential extent, the inner coupler member 77 has the form of a band or strap 112 whose inside diameter is only sufficiently greater than the outside diameter of the pipeline section 72 to permit the coupler member 77 to be slid onto the pipeline section 72 to the desired distance from the end 72 thereof. Two outwardly projecting protrusions 114 are formed in diametrically opposite positions upon the coupler member 77, each of these protrusions being similar in cross sectional configuration, taken axially of the coupler member, to the protrusions 27 of the inner coupler member 15 of the first described embodiment. The outer surface 116 of each protrusion 114 has the form of a segment of a spherical zone, being arcuately convex in longitudinal section, as shown in FIG. 6. The center C2 of the arcs thus defined by the surfaces 116 lies in the axis of the coupler member 77 approximately midway between the end 78 of the pipeline section and the plane of the nearer end of the coupler member 77, where it is in radial alignment with the seal ring 108, corresponding to the location of the center C in the first described embodiment.

The circle which includes the arcuate inner surfaces 98 of the flanges 94 of the outer coupling member 75 is greater than the circle which includes the smaller ends 118 of the protrusions 114 of the inner coupling member 77 but is smaller than the circle which includes the larger ends 120 of the protrusions 114, as clearly shown in FIG. 6. The angular, or circumferential spaces 122 between the protrusions 114 correspond to the depressions 52 in the outer circumference of the inner coupling member 15 of the first described embodiment, although each space 122 is of much greater angular extent, due to the fact that there are only two of them, as compared with three in the first described embodiment, and to the further fact that the angular extent of the protrusions 114 is only about two thirds that of the protrusions 27. In the embodiment of FIGS. 6 and 7, the angular extent of the protrusions 114 is approximately twice that of the flanges 94, as clearly shown in FIG. 7.

The inner coupler member 77 can be inserted into the outer coupler member 75, providing that they are so related that the flanges 94 are in registry with the depressions 122, until the larger ends 120 of the protrusions 114 of the inner coupler member 77 have passed inward beyond the transverse plane which includes the inner edges 100 of the inner surfaces 98 of the flanges 94. The coupler members 75 and 77 can then be turned relatively to each other in either direction until the flanges 94 no longer register with the depressions 122. Then the flanges 94 overlap the outer spherical surfaces 116 of the protrusions 114 as in the first described embodiment, to thereby restrain the coupler members 75 and 77 from separating from each other in relative axial movement, as indicated in FIG. 6.

The inner coupler member 77 is permanently mounted, as by welding, axially inward from the outer end 78 of the pipeline section 72, so that when the coupler members 75 and 77 are in interengaged relation, the projecting, or lead-in, portion 110 of the pipeline section 72 extends into sealing engagement with the inner lip 109 of the seal ring 108. Thus, an important distinction of the second described embodiment is that a portion 110 of the pipeline section rather than a part of the inner coupling member, makes sealing engagement with the seal ring carried by the outer coupling member. The lead-in portion 110 of the pipeline section 72 extends into the outer coupling member almost, but not quite to, the adjacent end of the other pipeline section, so as to avoid blocking the opening from the bore of the coupling 70 to the seal 108 and yet to minimize turbulence of the fluid flowing through the coupling. To strengthen the end 78 of the pipeline section 72 a rolled edge, or inner annular rib 126, is formed thereon.

The manner in which the coupler members 75 and 77 are engaged with each other to interconnect the two pipeline sections 71 and 72 in flow conducting communication should be apparent from the above description of the construction of the coupling 70. The two coupler members 75 and 77 are first brought into, or nearly into, coaxial relation. Either or both of the pipe sections 71 and 72 with the coupler members 75 and 77 thereon, are rotated about their respective axes until the flanges 94 and depressions 122 are in alignment with each other, whereupon one or both members 75 and 77 can be moved axially, with each flange 94 passing through one of the depressions 122, thus to effect telescoping of the inner member 77 into the outer member 75. This disposes the lead-in portion 110 of the pipeline section 72 within the seal ring 108 in fluid sealing relation therewith, and likewise disposes the larger ends 120 of the protrusions 114 of the inner member 77 more deeply within the outer member 75 than the plane which includes the inner edges 100 of the flanges 94. Then either coupler member 75 or 77 can be turned relatively to the other, disposing each flange 94 behind one of the protrusions 114. When the coupler members 75 and 77 are turned relatively until each flange 94 is centered with respect to its associated protrusion 114, measured circumferentially, as indicated clearly in FIG. 7, the two coupler members 75 and 77 have attained their optimum relative poistion providing the greatest security of the made-up coupling.

Uncoupling of the coupler members 75 and 77 to disconnect the pipe sections 71 and 72 is accomplished by reversal of the above described coupling operation. The coupler members 75 and 77 are first relatively turned by the operator in either direction until the flanges 94 and the depressions 122 are again brought into registry, whereupon the coupler members can be moved apart axially, thus disconnecting the pipe sections 71 and 72.

As clearly shown in FIG. 6, the outside diameter of each part of the inner coupler member 77 (except the parts of the protrusions 114 in engagement with the flanges 94) and the lead-in portion 110 of the pipe section 72 is significantly smaller than the inside diameter of the respective part of the outer coupler member 75 which is in radial alignment therewith when the coupling 70 is fully made-up. This feature, in conjunction with the longitudinally curved nature of the outer surface 116 of the protrusions 114 and the yieldable and deformable characteristic of the seal ring 108 permits the coupling 70 to be made up in the manner described above, and thus to interconnect the two pipeline sections 71 and 72 in flow conducting communication and without leakage at the coupling, even when the two pipeline sections 71 and 72 are several degrees out of alignment. Thus, the longitudinally convex nature of the outer surfaces 116 of the protrusions 114 and the location of the center of curvature C2 in radial alignment with the seal ring 108 when the coupling is made up, serve the same purposes as the longitudinal curvature of the outer surfaces 51 of the protrusions 27 and the location of the center of curvature C, respectively, in the first described embodiment of the invention.

While two embodiments of the present invention have been shown and described it will be understood that the coupling is capable of further modification and variation while still employing the principles of the invention. It is to be understood, therefore, that the scope of the invention should be limited only by the scope and proper interpretation of the claims appended hereto.

The invention having thus been described, that which is believed to be new and for which protection by Letters Patent is desired, is.

I claim:

1. A coupling comprising tubular inner conduit means having a rear end portion, a forward cylindrical end portion, and an intermediate annular, peripheral interlock portion between said end portions, the interlock portion including a plurality of circumferentially extending and circumferentially spaced protrusions, said protrusions having front surfaces extending outward from said forward end portion and longitudinally convex outer back surfaces each convergently extending inward from the front surfaces to said rear end portion, said coupling also comprising a tubular outer coupler circumscribing said intermediate and forward end portions and having a rear portion, a forward end portion, and an intermediate portion between said forward and rear end portions of the outer coupler, said back surfaces having a common center of curvature located on the axis of the conduit means and in a plane which is perpendicular to said axis and which passes through said forward end portion., said outer coupler also having an annular rib projecting radially inward from the intermediate portion of the outer coupler toward said forward end portion of the conduit means, said rib having an inner edge circumferentially spaced from said forward end portion of the conduit means, said intermediate portion and rib of the outer coupler and said front end portion of the conduit means providing an annular groove which surrounds said conduit means and communicates with the interior thereof through an annular space between the rear end portion of the outer coupler and the forward end portion of the conduit means, a chevron-type seal ring seated within the groove against said rib and having an outer lip against the outer coupler and an inner lip against said forward end portion of the conduit means, said lips having a V-shaped space therebetween communicating with the space between said outer coupler and conduit means, the outer coupler also having a cylindrical inner surface projecting axially forward from said rib in surrounding circumferentially spaced relation to said protrusions, the outer coupler also having a plurality of flanges projecting radially inward from said inner surface at the forward end portion of the outer coupler, said flanges having inner arcuate edges engaging the back surfaces of corresponding protrusions on the conduit means so that upon axial misalignment between the coupler and conduit means, said edges of the flanges slide over and remain in contact with the back surfaces of the protrusions.

2. The coupling of claim 1 wherein said protrusions and flanges have opposite ends, wherein a limit stop projects from one of the ends of one of the protrusions and abuts the end of the flange engaged by said one protrusion thereby to limit relative rotation between said conduit means and outer coupler.

References Cited by the Examiner
UNITED STATES PATENTS

| 2,652,828 | 9/1953 | Matheson | 285—368 |
| 2,806,717 | 9/1957 | Hempel | 285—5 |

FOREIGN PATENTS

| 207,114 | 12/1955 | Australia. |
| 1,208,996 | 2/1960 | France. |
| 367,363 | 3/1963 | Switzerland. |

CARL W. TOMLIN, *Primary Examiner.*